(12) United States Patent  
Mizumaki

(10) Patent No.: US 7,183,676 B2  
(45) Date of Patent: Feb. 27, 2007

(54) STEPPING MOTOR

(75) Inventor: Masao Mizumaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/225,538

(22) Filed: Sep. 13, 2005

(65) Prior Publication Data

US 2006/0055253 A1    Mar. 16, 2006

(30) Foreign Application Priority Data

Sep. 14, 2004    (JP) ............... 2004-266828

(51) Int. Cl.
*H02K 5/16*    (2006.01)

(52) U.S. Cl. ..................... 310/49 R; 310/90
(58) Field of Classification Search .......... 310/49 R, 310/90, 254, 257–259
See application file for complete search history.

(56) References Cited

U.S. PATENT DOCUMENTS

| | | | | |
|---|---|---|---|---|
| 1,896,265 A | * | 2/1933 | Weichsel | 310/68 R |
| 5,264,747 A | * | 11/1993 | Kawamura | 310/49 R |
| 5,384,506 A | * | 1/1995 | Aoshima | 310/49 R |
| 5,831,356 A | | 11/1998 | Aoshima | |
| 5,854,526 A | * | 12/1998 | Sakamoto | 310/254 |
| 6,255,749 B1 | | 7/2001 | Aoshima | |
| 6,979,918 B2 | * | 12/2005 | Aoshima et al. | 310/49 A |

FOREIGN PATENT DOCUMENTS

| | | |
|---|---|---|
| JP | 9-331666 | 12/1997 |
| JP | 10-229670 | 8/1998 |
| JP | 2000-287434 | 10/2000 |

* cited by examiner

*Primary Examiner*—Dang Le
(74) *Attorney, Agent, or Firm*—Cannon U.S.A. Inc. I.P. Div

(57) ABSTRACT

A small-sized and low-cost stepping motor includes a stator made of a soft magnetic material integrally having first and second outer magnetic poles, a first coil wound around a first bobbin externally fitted to the first outer magnetic pole, a second coil wound around a second bobbin externally fitted to the second outer magnetic pole, and a rotor part made of a soft magnetic material having a magnet fixed around a first column part by interference fit. The rotor part is rotatably supported by a first shaft part of a cover in a hole of the rotor part. An urging member made of a nonmagnetic material is rotatably fitted into the hole of the rotor part, and a compression coil spring urging the rotor part in the axial direction together with the urging member is disposed in the hole.

5 Claims, 11 Drawing Sheets

STEPPING MOTOR

BACKGROUND OF THE INVENTION

1. Field of the Invention

The present invention relates to a stepping motor, and more particularly, to a cylindrical stepping motor.

2. Description of the Related Art

As a first conventional example, a stepping motor having a small diameter centering on a rotary shaft and an increased output has been proposed (for example, see Japanese Patent Application Laid-Open No. 9-331666, corresponding to U.S. Pat. No. 5,831,356).

FIG. 9 is an exploded perspective view of the stepping motor of the first conventional example, and FIG. 10 is a longitudinal cross-sectional view of the stepping motor shown in FIG. 9.

In FIGS. 9 and 10, the stepping motor of the first conventional example includes a first stator 204 and a second stator 205 made of a soft magnetic material, a connection ring 207 made of a nonmagnetic material, an output shaft 206, and a rotor 201 made of a permanent magnetic material. The first stator 204 and the second stator 205 are opposed to each other at a predetermined interval in the axial direction of the motor. The connection ring 207 keeps the first stator 204 and the second stator 205 having the predetermined interval therebetween. The output shaft 206 is rotatably supported by a bearing part 204E of the first stator 204 and a bearing part 205E of the second stator 205. The rotor 201 is fixed to the output shaft 206 and is divided into four pieces in the circumferential direction, which are alternately magnetized into different poles.

The first stator 204 has a top end part having a comb-tooth shape and includes first outer magnetic poles 204A and 204B and first inner magnetic poles 204C and 204D. The first outer magnetic poles 204A and 204B are opposed to the outer circumferential surface of the rotor 201 at a predetermined space. The first inner magnetic poles 204C and 204D are opposed to the inner circumferential surface of the rotor 201 at a predetermined space. The second stator 205 includes second outer magnetic poles 205A and 205B and second inner magnetic poles 205C and 205D. The second outer magnetic poles 205A and 205B are opposed to the outer circumferential surface of the rotor 201 at a predetermined space. The second inner magnetic poles 205C and 205D are opposed to the inner circumferential surface of the rotor 201 at a predetermined space.

On the first inner magnetic poles 204C and 204D, a first coil 202 for exciting the first stator 204 is wound adjacent to the rotor 201 in the axial direction of the motor. On the second inner magnetic poles 205C and 205D, a second coil 203 for exciting the second stator 205 is wound adjacent to the rotor 201 in the axial direction of the motor.

In the stepping motor configured as described above, the rotor 201 is rotated by switching the energizing direction to the first coil 202 and the second coil 203 to switch each magnetic polarity of the first outer magnetic poles 204A and 204B, the first inner magnetic poles 204C and 204D, the second outer magnetic poles 205A and 205B, and the second inner magnetic poles 205C and 205D.

In the stepping motor, a magnetic flux generated by energizing the coil flows from the outer magnetic pole to the inner magnetic pole opposed to the outer magnetic pole, or from the inner magnetic pole to the outer magnetic pole opposed to the inner magnetic pole, to thereby effectively act on the cylindrical magnet positioned between the outer magnetic pole and the inner magnetic pole. Further, since the interval between the outer magnetic pole and the inner magnetic pole can be made into the thickness of the cylindrical magnet, resistance of a magnetic circuit composed of the outer magnetic pole and the inner magnetic pole can be decreased. Thus, it is possible to generate a large magnetic flux with a little current, to thereby increase the output.

Further, as a second conventional example configured by improving the above-described stepping motor, the following stepping motor has been proposed. That is, in the stepping motor, an inner magnetic pole is made to have a cylindrical shape, an output shaft inserted into an inner diameter part of the inner magnetic pole is made of a soft magnetic material, and a bearing part mounted on a stator to rotatably keep the output shaft is made of a nonmagnetic material (see Japanese Patent Application Laid-Open No. 10-229670). According to this stepping motor, the output of the motor can be increased by using the output shaft as a magnetic circuit. Further, by making the bearing part of a nonmagnetic material, the magnetic attraction between the stator and the output shaft can be prevented when increasing the output of the motor.

Further, as a third conventional example configured by improving the above-described stepping motor of the first conventional example, a stepping motor in which a rotary shaft of the motor is urged in the axial direction has been proposed (see Japanese Patent Application Laid-Open No. 2000-287434, corresponding to U.S. Pat. No. 6,255,749).

FIG. 11 is a longitudinal cross-sectional view of the stepping motor of the third conventional example.

In FIG. 11, the stepping motor of the third conventional example includes a first stator 318, a second stator 319, a connection ring 320, a frame 323, an output shaft 307, and a cylindrical rotor 301. The first stator 318 and the second stator 319 are made of a soft magnetic material and are opposed to each other at a predetermined interval in the axial direction of the motor. The connection ring 320 connects the first stator 318 with the second stator 319. The frame 323 is fixed to the second stator 319. The output shaft 307 is rotatably supported by a bearing part 325 of the first stator 318 and a top end bearing part 324 of the frame 323. The rotor 301 is made of a permanent magnet and is fixed to the output shaft 307 by press fitting.

The first stator 318 has a top end part having a comb-tooth shape and includes an outer cylinder 318a, an inner cylinder 318b, and a first auxiliary stator 321. The outer cylinder 318a is opposed to an outer circumferential surface of the rotor 301 at a predetermined interval, to thereby constitute a first outer magnetic pole. The inner cylinder 318b is opposed to an inner circumferential surface of the rotor 301 at a predetermined interval. The first auxiliary stator 321 constitutes a first inner magnetic pole in association with the inner cylinder 318b. The second stator 319 has a top end part having a comb-tooth shape and includes an outer cylinder 319a, an inner cylinder 319b, and a second auxiliary stator 322. The outer cylinder 319a is opposed to the outer circumferential surface of the rotor 301 at a predetermined interval, to thereby constitute a second outer magnetic pole. The inner cylinder 319b is opposed to the inner circumferential surface of the rotor 301 at a predetermined interval. The second auxiliary stator 322 constitutes a second inner magnetic pole in association with the inner cylinder 319b.

On the first inner cylinder 318b, a first coil 302 for exciting the first stator 318 is wound adjacent to the rotor 301 in the axial direction of the motor. On the second inner cylinder 319b, a second coil 303 for exciting the second stator 319 is wound adjacent to the rotor 301 in the axial direction of the motor.

A lead screw part 307a is formed on the output shaft 307 and is engaged with a female screw (not shown) to linearly move the female screw when the output shaft 307 is rotated.

The first inner cylinder 318b of the first stator 318 contains a slide member 326 housed therein, a cover 328 fixed to an end part thereof, and a compression coil spring 327. The compression coil spring 327 urges the output shaft 307 towards the top end bearing part 324 through the slide member 326. Thus, concerning the position of the output shaft 307 in the axial direction, the output shaft 307 is urged towards the top end bearing part 324 by the compression coil spring 327. Thereby, the position in the axial direction of the output shaft 307 is defined while removing a hysteresis difference generated by a rotating position of the output shaft 307. In this case, since an urging unit composed of the compression coil spring 327 and the slide member 326 is housed inside the first inner cylinder 318b, the stepping motor can be configured in a compact manner.

However, as for the stepping motors proposed in the above-described first conventional example to the third conventional example, these motors are required to have a predetermined clearance between the inner diameter of the magnet and the inner magnetic pole opposed thereto, and controlling this clearance increases cost in the production process. Further, as for the shape of the stator, the cylindrical inner magnetic pole and outer magnetic pole are required, and it is hard to integrally construct these poles in the process of manufacturing parts. Furthermore, if these poles are manufactured separately and, thereafter, integrally assembled, the number of parts is increased, thus resulting in a cost increase.

Further, as for the stepping motor proposed in the above-described second conventional example, a magnetic flux generated by energizing the first coil affects the second coil, the second outer magnetic pole, and the second inner magnetic pole through the output shaft made of a soft magnetic material. A magnetic flux generated by energizing the second coil affects the first coil, the first outer magnetic pole, and the first inner magnetic pole through the output shaft made of a soft magnetic material. Thereby, the rotation of the stepping motor becomes unstable.

Furthermore, as for the stepping motor proposed in the above-described third conventional example, since an urging unit is provided inside the inner magnetic pole, a space in the diameter direction of the coil is small as compared with the stepping motor proposed in the above-described first conventional example, so that the output of the stepping motor is decreased. Further, if the diameter of the motor is further reduced, it is hard to provide the urging unit. That is, if the outer diameter of the motor is reduced while keeping the minimum size of the urging unit, the width in the diameter direction of the motor must be reduced, so that an output torque of the stepping motor is decreased.

SUMMARY OF THE INVENTION

The present invention is directed to a small-sized and low-cost stepping motor which has a short length in the axial direction and a high output.

In one aspect of the present invention, a stepping motor includes a stator, a rotor, a first coil, a second coil, and an urging unit. The stator respectively has a first outer magnetic pole and a second outer magnetic pole which extend in an axial direction of the motor. The rotor, which is made of a soft magnetic material, is rotatably supported by the stator between the first outer magnetic pole and the second outer magnetic pole. The motor also includes a magnet fixed around the stator. The first coil and the second coil are respectively wound around the first outer magnetic pole and the second outer magnetic pole and between the magnet and the stator as viewed in the axial direction of the motor. The urging unit urges the rotor in the axial direction of the motor.

According to the above configuration, since the magnet is fixed around the rotor between the first outer magnetic pole and the second outer magnetic pole, the strength of the rotor can be increased and an inner magnetic pole can be formed at the rotor. Thereby, it is not necessary to have a clearance between the inner magnetic pole and the magnet. This configuration decreases the magnetic resistance, so that the output of the motor is increased. Further, since the inner magnetic pole is made to have the same length as the length in the axial direction of the magnet to thereby effectively use the outer magnetic poles and the magnet, the motor can be easily manufactured as compared with the configuration of connecting or integrating an outer magnetic pole and an inner magnetic pole. Further, assembly becomes easy by only controlling a clearance of the outer diameter part of the magnet, so that the defect rate can be decreased. In addition, since the rotor is urged in the axial direction of the motor, looseness of the rotor in the axial direction of the motor can be prevented, to thereby increase rotation accuracy and decrease driving noise. As a result of this, it is possible to provide a small-sized and low-cost stepping motor which has a short length in the axial direction and a high output.

Further, in an exemplary embodiment of the present invention, a hole and a cover made of a nonmagnetic material are provided. The hole is provided at a rotating center part of the rotor near the magnet. The cover is fixed to the stator for receiving the first outer magnetic pole, the second outer magnetic pole, the first coil, and the second coil, and has a supporting shaft part for rotatably fitting in the hole of the rotor.

Further, the urging unit is disposed in the hole, and includes an urging member made of a nonmagnetic material and a compression coil spring. The urging member has a spherical surface-shaped top end, and this top end comes into contact with the bottom surface of the hole. The compression coil spring is disposed between the supporting shaft part and the urging member in the hole.

According to the above configuration, since the urging unit is disposed in the hole provided at the rotor, the outer diameter of the motor can be prevented from increasing. In addition, the magnetic efficiency can be prevented from decreasing due to the magnetic paths of magnetic fields generated by energizing the first coil and the second coil.

Further, in another exemplary embodiment of the present invention, the supporting shaft part has a spherical surface-shaped top end, and this top end comes into contact with the bottom surface of the hole. The urging unit includes a compression coil spring disposed between the magnet and the stator in a space between the first coil and the second coil.

According to the above configuration, the supporting shaft part has a spherical surface-shaped top end, and this top end comes into contact with the bottom surface of the hole. Further, the urging unit includes a compression coil disposed between the magnet and the stator in a space between the first coil and the second coil. Thus, the rotor part can be accurately supported by the cover. In addition, slide friction can be decreased to facilitate smooth rotation.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Embodiment

Figure 1:
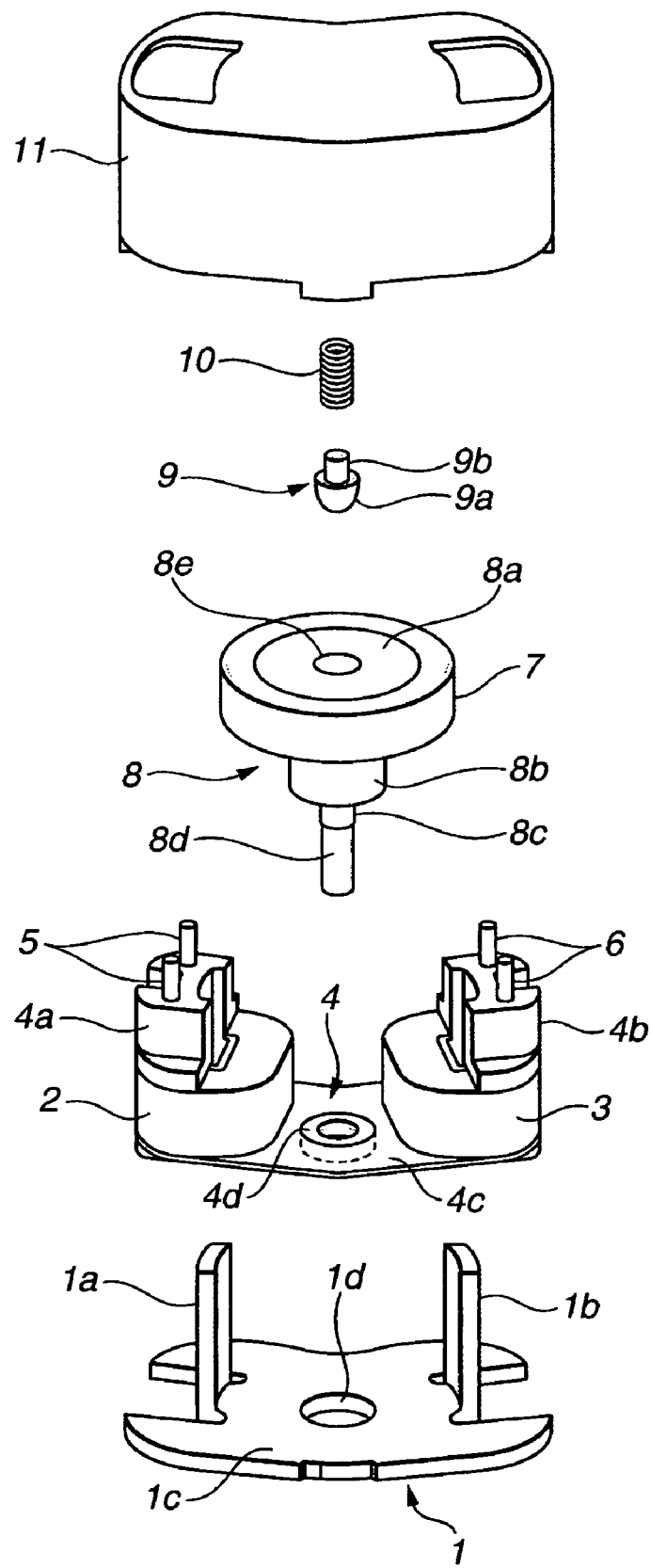
FIG. 1 is an exploded perspective view of a stepping motor according to a first embodiment of the present invention.
Figure 2:
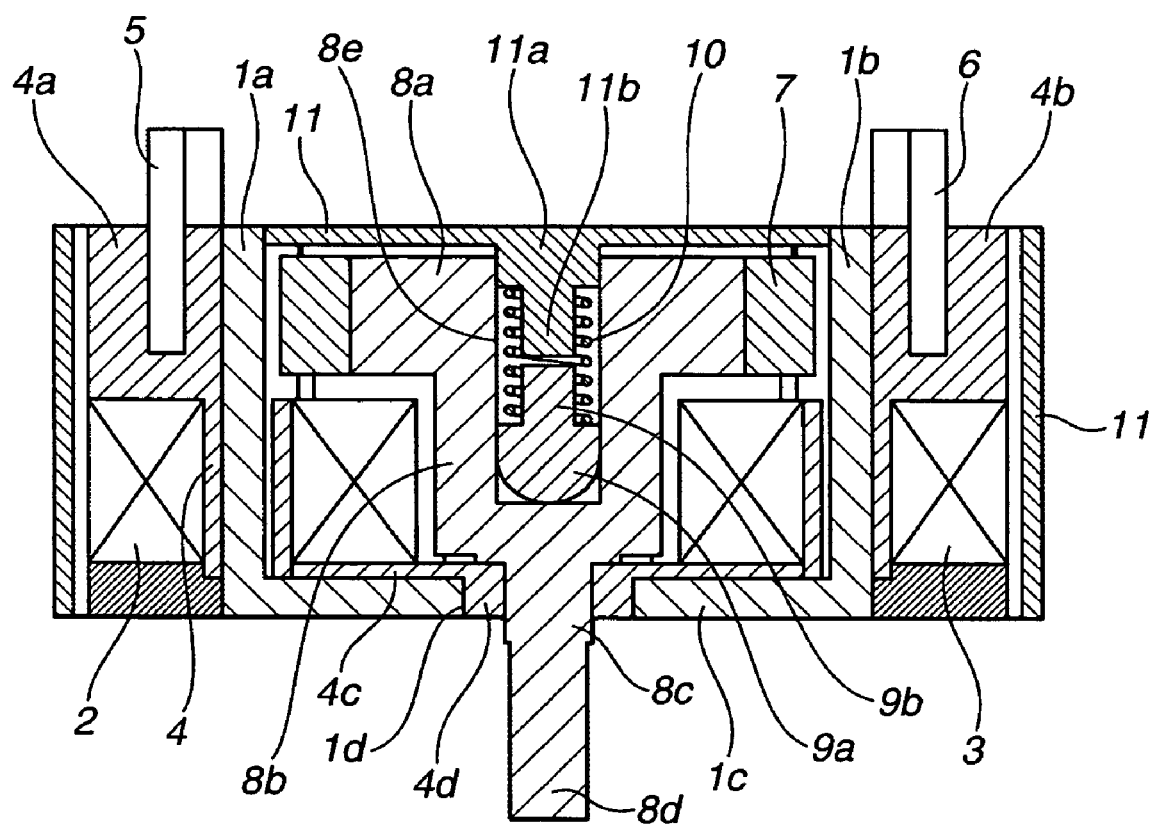
FIG. 2 is a longitudinal cross-sectional view of the stepping motor shown in FIG. 1.

FIG. 1 is an exploded perspective view of a stepping motor according to a first embodiment of the present invention. FIG. 2 is a longitudinal cross-sectional view of the stepping motor shown in FIG. 1.

The stepping motor illustrated in FIGS. 1 and 2 includes a stator 1 made of a soft magnetic material, a bobbin body 4, a first coil 2, and a second coil 3. The stator 1 includes a flat plate 1c, a first outer magnetic pole 1a, and a second outer magnetic pole 1b. The bobbin body 4 integrally includes a flat plate 4c, a first bobbin 4a, a second bobbin 4b, and a bearing part 4d. The flat plate 1c has a V shape of the opening angle θ (see FIG. 3). The first outer magnetic pole 1a and the second outer magnetic pole 1b are simply bent integrally with the flat plate 1c at both ends of the flat plate 1c, and are erected to have a comb-tooth shape in parallel with the rotary shaft of a rotor part 8 (the rotary shaft of the motor), which is described below. The stator 1 has a hole 1d at the center of the flat plate 1c. The flat plate 4c is put on the flat plate 1c, and has the same V shape as that of the flat plate 1c. The first bobbin 4a is erected at one end of the flat plate 4c, and is externally fitted to the first outer magnetic pole 1a. The second bobbin 4b is erected at another end of the flat plate 4c, and is externally fitted to the second outer magnetic pole 1b. The bearing part 4d is provided at the center of the flat plate 4c, and is fitted into the hole 1d of the stator 1. The first coil 2 is wound around the first bobbin 4a.

The second coil 3 is wound around the second bobbin 4b. As for the first bobbin 4a, an inside part thereof is cut off so as to expose an upper part of the first outer magnetic pole 1a in FIG. 1. As for the second bobbin 4b, an inside part thereof is cut off so as to expose an upper part of the second outer magnetic pole 1b in FIG. 1. Further, the first bobbin 4a has two terminal pins 5 erected thereon, and the second bobbin 4b has two terminal pins 6 erected thereon.

In FIG. 1, the stepping motor further includes the rotor part 8 and a cover 11. The rotor part 8 is made of a soft magnetic material and includes a first column part 8a having a large diameter, a second column part 8b having a small diameter, a supporting shaft part 8c, and an output shaft part 8d. The supporting shaft part 8c is rotatably supported by the bearing part 4d. The rotor part 8 has a magnet 7 fixed thereto by interference fit around the first column part 8a. The cover 11 is made of a nonmagnetic material and is fixed to the stator 1 so as to house the stator 1, the bobbin body 4, and the rotor part 8. The cover 1 has a first shaft part 11a and a second shaft part 11b at the center of the rear side thereof. The second shaft part 11b has a smaller diameter than that of the first shaft part 11a.

The rotor part 8 has a hole 8e for receiving the first shaft part 11a of the cover 11. The rotor part 8 is rotatably supported by the first shaft part 11a of the cover 11 in the hole 8e.

In the hole 8e of the rotor part 8, an urging member 9 composed of a first column part 9a and a second column part 9b are rotatably fitted. The urging member 9 is made of a nonmagnetic material. The first column part 9a has a spherical surface-shaped top end, and this top end is in contact with the bottom surface of the hole 8e. The second column part 9b has a diameter smaller than that of the first column part 9a. Further, in the hole 8e, a compression coil spring 10 is provided between the first shaft part 11a and the first column part 9a. The compression coil spring 10 urges the rotor part 8 in the axial direction of the motor (the downward direction in FIG. 2) together with the urging member 9. As for the rotor part 8, the positioning in the axial direction is made by the second column part 8b being in contact with the bearing part 4d of the bobbin body 4. That is, the rotor part 8, to which the magnet 7 is fixed, is urged in the axial direction of the motor (the downward direction in FIG. 2) by the urging member 9 and the compression coil spring 10 arranged in the hole 8e of the rotor part 8, to thereby be biased in the axial direction of the motor.

The stator 1 is different from those indicated in the first conventional example to the third conventional example, and has a configuration where the first outer magnetic pole 1a and the second outer magnetic pole 1b are integrated with the flat plate 1c. Therefore, there is little mutual difference between the first outer magnetic pole 1a and the second outer magnetic pole 1b, so that variations in motor performance caused by assembly can be kept to a minimum.

The first bobbin 4a is externally fitted to the first outer magnetic pole 1a, and the first coil 2 is wound around the first bobbin 4a. The second bobbin 4b is externally fitted to the second outer magnetic pole 1b, and the second coil 3 is wound around the second bobbin 4b. Both ends of the first coil 2 are wound around the terminal pins 5 of the first bobbin 4a to be in a conducting state. Both ends of the second coil 3 are wounded around the terminal pins 6 of the second bobbin 4b to be in the conducting state. Thereby, when the first coil 2 is energized, the first outer magnetic pole 1a is excited, and when the second coil 3 is energized, the second outer magnetic pole 1b is excited.

The flat plate 4c of the bobbin body 4 has the bearing part 4d integrally formed thereon. The bearing part 4d rotatably supports the output shaft 8d of the rotor part 8. The bearing part 4d is positioned by fitting to the hole 1d of the stator 1.

The first coil 2 and the second coil 3 are arranged adjacently on a flat surface of the flat plate 1c of the stator 1. The second column part 8b of the rotor part 8 is arranged adjacently between the first coil 2 and the second coil 3. Thereby, the length in the axial direction of the motor can be shortened.

Further, by fixing a gear, a lever, a screw or the like (not shown) to the top end of the output shaft 8d, the rotating output can be obtained from such a part.

The magnet 7 is magnetized to have an S pole and an N pole arranged alternately such that the magnet 7 is multi-split in the circumference direction, that is, the number of magnetized poles is N (in the present embodiment, 6-split, that is, N=6). The inner circumferential surface of the magnet 7 can have a weak magnetization distribution as compared with the outer circumferential surface, cannot be magnetized at all, or can be magnetized with a pole opposite to that of the outer circumferential surface, that is, when the outer circumferential surface has an S pole, the corresponding inner circumferential surface is magnetized with an N pole.

The magnet 7 is fixed to the first column part 8a of the rotor part 8 by adhesion, pressing-in or the like, so as to have the same face between one end face of the magnet 7 and a top surface of the first column part 8a.

The first outer magnetic pole 1a and the second outer magnetic pole 1b are opposed to the outer circumferential surface of the magnet 7 at a predetermined interval. Further, a first inner magnetic pole is formed by a portion of the first column part 8a which is opposed to the first outer magnetic pole 1a and a portion of the second column part 8b which is opposed to the first coil 2. Similarly, a second inner magnetic pole is formed by a portion of the first column part 8a which is opposed to the second outer magnetic pole 1b and a portion of the second column part 8b which is opposed to the second coil 3. Accordingly, by energizing the first coil 2, the first outer magnetic pole 1a and the first inner magnetic pole are respectively excited to opposite poles. Then, a magnetic flux crossing the magnet 7 is generated between these poles, and effectively acts on the magnet 7. Similarly, by energizing the second coil 3, the second outer magnetic pole 1b and the second inner magnetic pole are respectively excited to opposite poles. Then, a magnetic flux crossing the magnet 7 is generated between these poles, and effectively acts on the magnet 7.

It is not necessary to provide a clearance between the outer circumferential portion of the first column 8a forming the inner magnetic pole inside the magnet 7 and the inner circumferential portion of the magnet 7. Thus, the interval between the first outer magnetic pole 1a and the first column part 8a and the interval between the second outer magnetic pole 1b and the first column part 8a can be reduced. Accordingly, the magnetic resistance of a magnetic circuit formed by the first coil 2, the first outer magnetic pole 1a, and the first inner magnetic pole and the magnetic resistance of a magnetic circuit formed by the second coil 3, the second outer magnetic pole 1b, and the second inner magnetic pole can be reduced. Thereby, the output of the motor can be increased.

Further, since the first inner magnetic pole and the second inner magnetic pole are constructed from the rotor part 8, the manufacturing cost can be reduced because the rotor part 8 serves also as an inner magnetic pole. Furthermore, as for the stator 1, since the first outer magnetic pole 1a and the second outer magnetic pole 1b are made only by bending in the axial direction of the motor, the stator 1 can be easily manufactured, thus reducing cost.

In the cases of the first to third conventional examples, the inner magnetic pole must be formed integrally with the outer magnetic pole in each of the first stator and the second stator. However, it is difficult in manufacturing to construct the inner magnetic pole and the outer magnetic pole from the same part. For example, these poles can be molded by metal injection molding. However, the manufacturing cost becomes high. Manufacturing these poles integrally by pressing becomes more difficult as they become smaller, as compared with the case where a part constituting only the outer magnetic pole is manufactured. Further, if the inner magnetic pole and the outer magnetic pole are separately manufactured and then integrally fixed to each other by caulking, welding or bonding, the manufacturing cost becomes high.

Further, as illustrated in FIG. 2, since the magnet 7 is fixed around the rotor part 8 by interference fit, the mechanical strength of the magnet 7 is high as compared with the first conventional example to the third conventional example. Further, the rotor part 8 serves also as a so-called back metal which decreases the magnetic resistance between the S pole and the N pole generated at the inner diameter part of the magnet 7. Thus, a permeance coefficient of the magnetic circuit is set high, and there is little magnetic degradation caused by demagnetization even when the motor is used under a high temperature condition.

Furthermore, as for the above-described first to third conventional examples, it is necessary to assemble a motor while keeping a clearance between the outer diameter part of the magnet and the outer magnetic pole with high accuracy, and to dispose the inner magnetic pole, which is opposed to the inner diameter part of the magnet, so as to have a predetermined clearance with respect to the magnet. Thus, if there are variations of the accuracy of parts or if the assembling accuracy is insufficient, the above clearances cannot be kept, and such a defect that the inner magnetic pole comes into contact with the magnet may occur. On the other hand, as for the embodiment of the present invention, only the clearance at the side of the outer diameter part of the magnet 7 must be controlled, so that assembling is easy.

Further, in the first to third conventional examples, the inner magnetic pole must be configured so as not to come into contact with a part connecting the magnet and the output shaft. Thereby, the length in the axial direction over which the inner magnetic pole is opposed to the magnet cannot be increased fully. On the other hand, in the embodiment of the present invention, since the output shaft serves also as the inner magnetic pole, the length in the axial direction over which the inner magnetic pole is opposed to the magnet can be kept fully long. Thereby, the first outer magnetic pole 1a, the second outer magnetic pole 1b, and the magnet 7 can be used effectively, thus increasing the output of the motor.

Further, since the first outer magnetic pole 1a and the second outer magnetic pole 1b have a comb-tooth shape extending in the axial direction of the motor, the outermost diameter of the motor (L1 in FIG. 3) can be minimized. For example, in the conventional examples, if the outer magnetic pole is constructed from a yoke plate extending in the radial direction of the magnet, the magnet must be plane-shaped and the coil must be wound in the radial direction. Thus, the outermost diameter of the motor becomes large even when the length in the axial direction is short. On the other hand, the outermost diameter (L1) of the motor in the embodiment of the present invention is defined by the diameter of the magnet 7, the thicknesses of the first outer magnetic pole 1a and the second outer magnetic pole 1b, and the winding widths of the first coil 2 and the second coil 3. Further, since the first outer magnetic pole 1a and the second outer magnetic pole 1b have a comb-tooth shape extending in the axial direction of the motor, the bobbin body 4 having the first coil 2 and the second coil 3 mounted thereon and the rotor part 8 having the magnet 7 fixed thereto can be fitted to the stator 1 from one direction (from top to bottom in FIG. 1), so that assembly is easy.

As illustrated in FIG. 2, the outer circumferential surface of the magnet 7 fixed to the rotor part 8 has a predetermined clearance in the diameter direction of the motor with respect to the first outer magnetic pole 1a and the second outer magnetic pole 1b. In addition, the upper end of the magnet 7 keeps a predetermined clearance with respect to the rear surface of the cover 11 in the axial direction, and the lower end of the magnet 7 keeps a predetermined clearance with respect to the first coil 2 and the second coil 3 in the axial direction. Thus, the length in the axial direction of the motor can be reduced.

Further, since the hole 8e is formed on the center of the rotor part 8 (FIG. 2), the magnetic resistance is increased between the inner magnetic poles. Further, also in this case, the facing area between the first column part 8a of the rotor part 8 and the first outer magnetic pole 1a of the stator 1 is not reduced, thereby preventing the magnetic resistance between the first column part 8a and the first outer magnetic pole 1a from increasing. Similarly, the facing area between the first column part 8a of the rotor part 8 and the second outer magnetic pole 1b of the stator 1 is not reduced, thereby preventing the magnetic resistance between the first column part 8a and the second outer magnetic pole 1b from increasing. Accordingly, the interference can be remarkably decreased, which is induced between the magnetic path of the magnetic field generated by energizing the first coil 2 and the magnetic path of the magnetic field generated by energizing the second coil 3, and the rotary torque can be kept. Thereby, the rotation accuracy can be remarkably increased.

Furthermore, the rotor part 8 having the magnet 7 fixed thereto is urged in the axial direction of the motor (the downward direction in FIG. 2) by the urging unit composed of the urging member 9 and the compression coil spring 10, which are disposed in the hole 8e provided at the rotor part 8. Thus, the backlash in the axial direction of the motor of the rotor part 8 can be prevented, and it is possible to improve the rotation accuracy and to reduce the driving noise, as in the motor of the third conventional example.

As for the motor of the third conventional example, since the urging unit is disposed inside the inner magnetic pole, a space for the coil in the radial direction is small as compared with the motor of the first conventional example, thus decreasing the output. Further, if the diameter of the motor is further reduced, it becomes hard to provide the urging unit. That is, if the outer diameter of the motor is reduced while keeping the minimum size of the urging unit, the width of the coil in the diameter direction must be further reduced, so that the output torque is remarkably decreased.

On the other hand, in the embodiment of the present invention, the urging unit can be arranged inside the motor without increasing the outer diameter of the motor. Also, the urging unit is arranged at such a position as not to affect the magnetic path of the magnetic field generated by energizing the first coil 2 and the magnetic path of the magnetic field generated by energizing the second coil 3. Thereby, the urging unit can be arranged while keeping the output torque without decreasing the magnetic efficiency, so that the size of the motor can be further reduced.

Further, the rotor part 8 is pressed in the axial direction of the motor by the spherical-shaped lower end of the urging member 9, and is rotatably supported by the bearing part 4d of the bobbin body 4. Thus, the slide friction is decreased, and, thereby, the rotation of the rotor part 8 becomes smooth.

As for the compression coil spring 10, its one end is externally fitted to the second column part 9b of the urging member 9, and the other end is externally fitted to the second shaft part 11b of the cover 11. Thus, the compression coil spring 10 can be prevented from being rotated by the rotation of the rotor part 8, and, thereby, the rotor part 8 can be stably biased. In addition, it is possible to prevent abnormal noise from occurring during the rotation of the rotor part 8.

Figure 3:
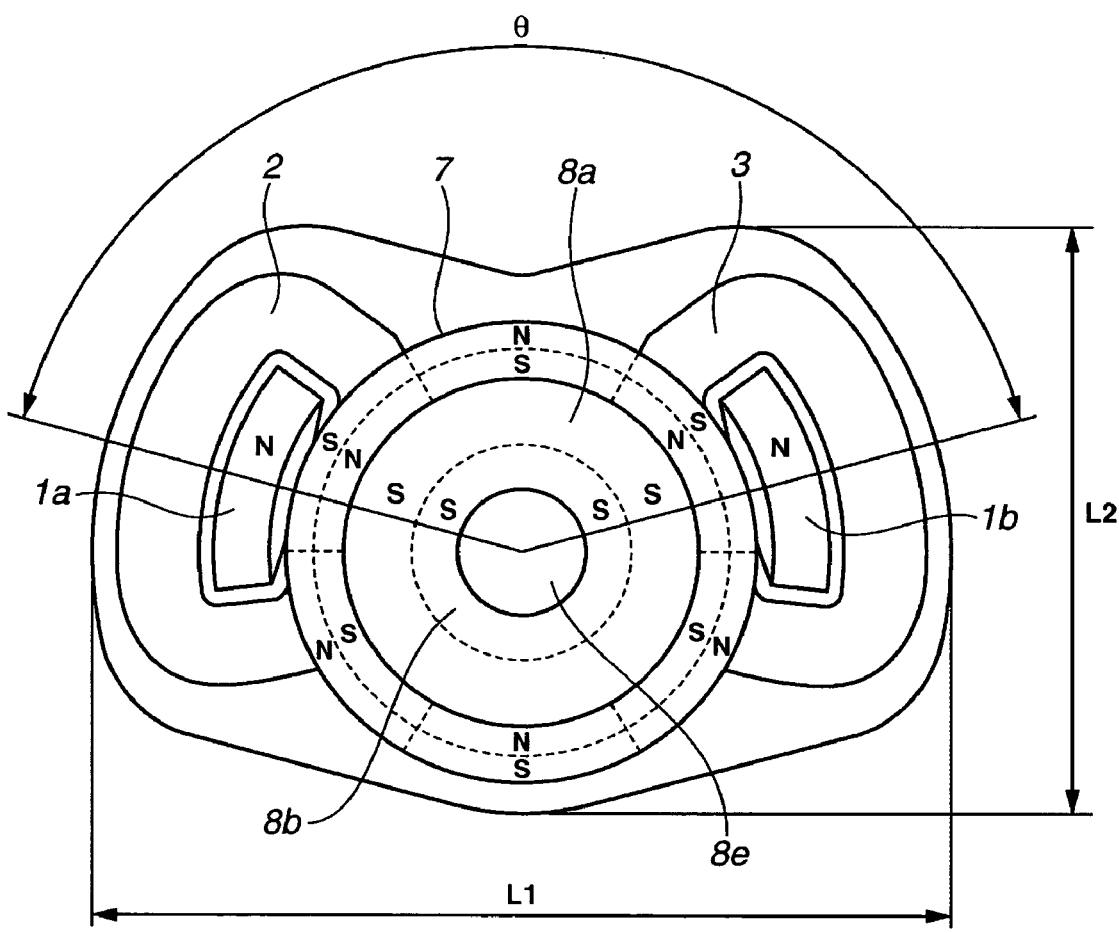
FIG. 3 is a top view of the inside structure of the stepping motor shown in FIG. 1, illustrating a case where the stepping motor is in a first energizing state.

FIG. 3 is a top view of the inside structure of the stepping motor shown in FIG. 1, illustrating a case where the stepping motor is in a first energizing state.

In FIG. 3, as for the magnet 7 of the rotor part 8, its outer and inner circumferential surfaces are divided into plural pieces at an interval of an equal angle in the circumference direction (in the present embodiment, these surfaces are divided into 6 pieces), and are magnetized with the S pole and the N pole alternately. A part having the S pole on the outer circumferential surface has the N pole on the inner circumferential surface, and a part having the N pole on the outer circumferential surface has the S pole on the inner circumferential surface. Further, the first outer magnetic pole 1a and the second outer magnetic pole 1b are arranged at locations shifted from each other by $\theta°$ in phase with respect to the rotating center of the magnet 7. In this case, $\theta°$ is defined by the formula of $180°-180°/N$, where N is the number of magnetization divisions. In the embodiment of the present invention, since N is 6, $\theta°$ is 150°. By defining $\theta°$ with the formula of $180°-180°/N$, the length L2 in FIG. 3 can be reduced.

According to the above-described configuration, the first outer magnetic pole 1a and the second outer magnetic pole 1b are arranged to face respective different angle ranges of the magnet 7 on the same surface perpendicular to the axial direction of the motor. Thus, the magnet 7 can be shortened in the axial direction of the motor. Thereby, the motor can also be shortened in the axial direction of the motor.

The characteristic of the above configuration is as follows. That is, as the magnet 7 rotates, two magnetic fluxes, i.e., the magnetic flux of the first outer magnetic pole 1a excited by the first coil 2 and the magnetic flux of the second outer magnetic pole 1b excited by the second coil 3, alternately act on the same part of the outer circumferential surface of the magnet 7. Thus, the magnetic fluxes of the outer magnetic poles 1a and 1b act on the same portion of the magnet 7. Accordingly, any adverse effect caused by the variation of magnetization can be prevented, and the performance of the motor can be stabilized.

Operation of the stepping motor shown in FIG. 1 is described below with reference to FIGS. 3 to 6.

In FIG. 3, by energizing the first coil 2 in the forward direction, the first outer magnetic pole 1a is excited to the N pole, and the first inner magnetic pole (a portion of the first column part 8a and the second column part 8b facing the first outer magnetic pole 1a) is excited to the S pole. Further, by energizing the second coil 3 in the forward direction, the second outer magnetic pole 1b is excited to the N pole, and the second inner magnetic pole (a portion of the first column part 8a and the second column part 8b facing the second outer magnetic pole 1b) is excited to the S pole (a first energizing state).

Then, when only the energizing direction to the first coil 2 is switched to the backward direction from the state of FIG. 3, the first outer magnetic pole 1a is excited to the S pole, and the first inner magnetic pole is excited to the N pole. Then, as illustrated in FIG. 4, the magnet 7 is rotated by 30° in the clockwise direction (a second energizing state).

Figure 4:
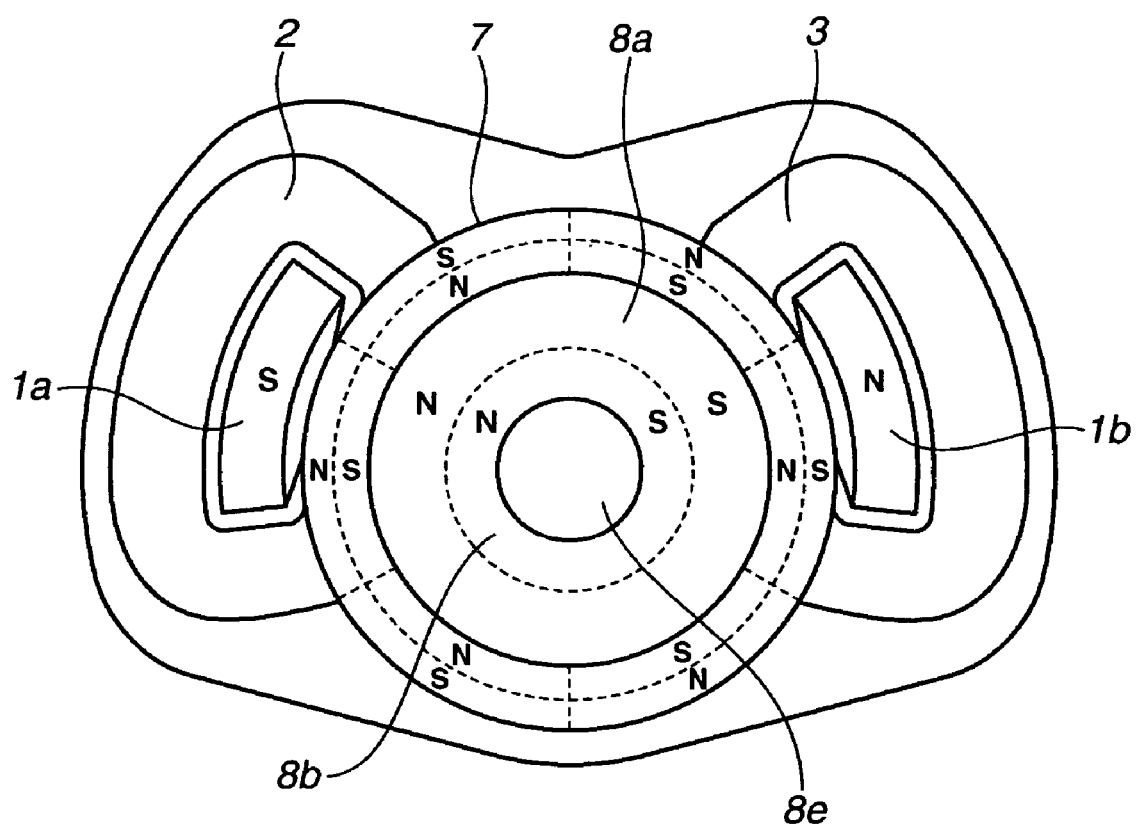
FIG. 4 is a top view of the inside structure of the stepping motor shown in FIG. 1, illustrating a case where the stepping motor is in a second energizing state.

Further, when only the energizing direction to the second coil 3 is switched to the backward direction from the state of FIG. 4, the second outer magnetic pole 1b is excited to the S pole, and the second inner magnetic pole is excited to the N pole. Then, as illustrated in FIG. 5, the magnet 7 is further rotated by 30° in the clockwise direction (a third energizing state).

Figure 5:
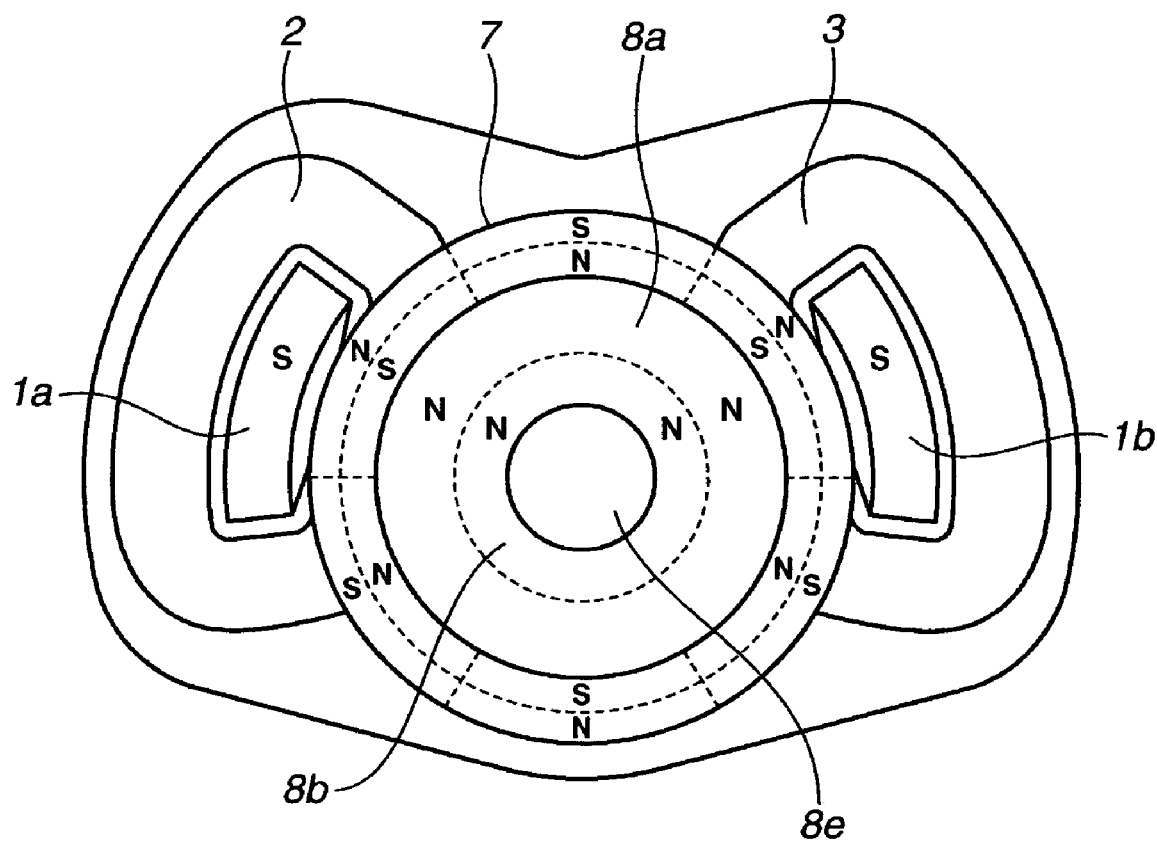
FIG. 5 is a top view of the inside structure of the stepping motor shown in FIG. 1, illustrating a case where the stepping motor is in a third energizing state.
Figure 6:
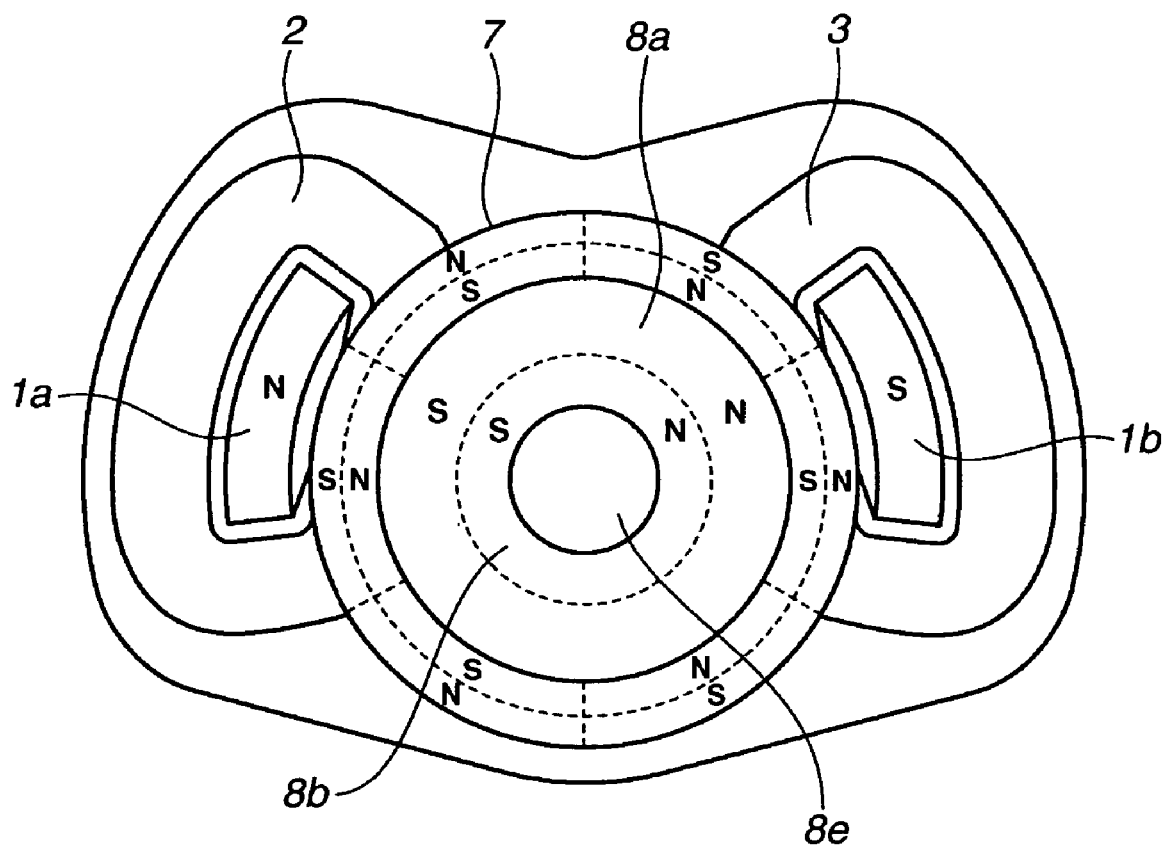
FIG. 6 is a top view of the inside structure of the stepping motor shown in FIG. 1, illustrating a case where the stepping motor is in a fourth energizing state.

Then, when only the energizing direction to the first coil 2 is switched to the forward direction from the state of FIG. 5, the first outer magnetic pole 1a is excited to the N pole, and the first inner magnetic pole is excited to the S pole. Then, as illustrated in FIG. 6, the magnet 7 is further rotated by 30° in the clockwise direction (a fourth energizing state).

After that, when the energizing directions to the first coil 2 and the second coil 3 are sequentially switched in a similar manner, the excitations of the first outer magnetic pole 1a and the second outer magnetic pole 1b are switched in respective different timings, so that the magnet 7 is rotated to the position corresponding to the energizing phase.

As described above, in the embodiment of the present invention, when the stepping motor is in the first energizing state, both of the first coil 2 and the second coil 3 are energized in the forward direction. When the stepping motor is in the second energizing state, the first coil 2 is energized in the backward direction and the second coil 3 is energized in the forward direction. When the stepping motor is in the third energizing state, both of the first coil 2 and the second coil 3 are energized in the backward direction. When the stepping motor is in the fourth energizing state, the first coil 2 is energized in the forward direction and the second coil 3 is energized in the backward direction. Thus, the magnet 7 is rotated as the energizing states are switched in the order of the first energizing state, the second energizing state, the third energizing state, and the fourth energizing state.

The switching of the above energizing states may be changed to the switching of the following energizing states. That is, when the stepping motor is in a fifth energizing state, both of the first coil 2 and the second coil 3 are energized in the forward direction. When the stepping motor is in a sixth energizing state, the first coil 2 is not energized and the second coil 3 is energized in the forward direction. When the stepping motor is in a seventh energizing state, the first coil 2 is energized in the backward direction and the second coil 3 is energized in the forward direction. When the stepping motor is in an eighth energizing state, the first coil 2 is energized in the backward direction and the second coil 3 is not energized. The above energizing states are switched in the order of the fifth energizing state, the sixth energizing state, the seventh energizing state, and the eighth energizing state. Thereby, the magnet 7 is rotated to the rotating position corresponding to the energizing phase.

The phase relation among the magnet 7, the first outer magnetic pole 1a, and the second outer magnetic pole 1b is described next.

As described above, when the energizing states are switched in the order of the first energizing state, the second energizing state, the third energizing state, and the fourth energizing state, the first outer magnetic pole 1a and the second outer magnetic pole 1b are alternately subjected to the switching of the poles to be excited.

In FIG. 3, when the first outer magnetic pole 1a is excited to the N pole by energizing the first coil 2 in the forward direction, the rotational force in the counterclockwise direction in FIG. 3 is generated in the magnet 7 so as to make the center of the first outer magnetic pole 1a correspond to the center of the magnetized part of the magnet 7 (the center of the S pole). However, when the second outer magnetic pole 1b is excited to the N pole by energizing the second coil 3 in the forward direction simultaneously with the above energizing to the first coil 2, the rotational force in the clockwise direction in FIG. 3 is generated in the magnet 7 so as to make the center of the second outer magnetic pole 1b correspond to the center of the magnetized part of the magnet 7 (the center of the S pole). Thereby, the magnet 7 is stopped during this energizing state of the first and second coils 2 and 3 as the rotational forces are well-balanced. FIG. 3 illustrates this condition. When the amounts of energization to the first and second coils 2 and 3 are equal, the phase difference between the center of the first outer magnetic pole 1a and the center of the magnetized part of the magnet 7 (the center of the S pole) becomes about 15°, and the phase difference between the center of the second outer magnetic pole 1b and the center of the magnetized part of the magnet 7 (the center of the S pole) also becomes about 15°.

When the energizing direction of the first coil 2 is switched to the backward direction from the state of FIG. 3, the first outer magnetic pole 1a is excited to the S pole, and, thus, the rotational force in the clockwise direction in FIG. 3 is generated in the magnet 7 so as to make the center of the first outer magnetic pole 1a correspond to the center of the magnetized part of the magnet 7 (the center of the N pole). At this time, as the energizing to the second coil 3 is kept in the forward direction, the rotational force in the clockwise direction in FIG. 3 is also generated in the magnet 7 so as to make the center of the second outer magnetic pole 1b correspond to the center of the magnetized part of the magnet 7 (the center of the S pole). Accordingly, the magnet 7 starts rotating in the clockwise direction from the state of FIG. 3.

After the magnet 7 is rotated by about 15° from the state of FIG. 3, the center of the second outer magnetic pole 1b corresponds to the center of the magnetized part of the magnet 7 (the center of the S pole). At this time, the center of the first outer magnetic pole 1a corresponds to a boundary of the magnetized part of the magnet 7 (the boundary between the S pole and the N pole), and, thus, the force for further rotating the magnet 7 in the clockwise direction is generated. Then, after the magnet 7 is further rotated by about 15° from this state (rotated by about 30° in the clockwise direction from the state of FIG. 3), the magnet 7 is stopped at this position as the rotational forces caused by the first and second coils 2 and 3 are well-balanced. This condition is illustrated in FIG. 4.

When the energizing direction of the second coil 3 is switched to the backward direction from the state of FIG. 4, the second outer magnetic pole 1b is excited to the S pole, and, thus, the rotational force in the clockwise direction in FIG. 4 is generated in the magnet 7 so as to make the center of the second outer magnetic pole 1b correspond to the center of the magnetized part of the magnet 7 (the center of the N pole). At this time, as the energizing to the first coil 2 is kept in the forward direction, the rotational force in the clockwise direction in FIG. 4 is also generated in the magnet 7 so as to make the center of the first outer magnetic pole 1a correspond to the center of the magnetized part of the magnet 7 (the center of the N pole). Accordingly, the magnet 7 starts rotating in the clockwise direction from the state of FIG. 4.

After the magnet 7 is rotated by about 15° from the state of FIG. 4, the center of the first outer magnetic pole 1a corresponds to the center of the magnetized part of the magnet 7 (the center of the N pole). At this time, the center of the second outer magnetic pole 1b corresponds to a boundary of the magnetized part of the magnet 7 (the boundary between the S pole and the N pole), and, thus, the force for further rotating the magnet 7 in the clockwise direction is generated. Then, after the magnet 7 is further rotated about 15° from this state (rotated about 30° clockwise direction from the state of FIG. 4), the magnet 7 is stopped at this position as the rotational forces caused by the first and second coils 2 and 3 are well-balanced. This condition is illustrated in FIG. 5.

When the energizing direction of the first coil 2 is switched to the forward direction from the state of FIG. 5, the first outer magnetic pole 1a is excited to the N pole, and, thus, the rotational force in the clockwise direction in FIG. 5 is generated in the magnet 7 so as to make the center of the first outer magnetic pole 1a correspond to the center of the magnetized part of the magnet 7 (the center of the S pole). At this time, as the energizing to the second coil 3 is kept in the backward direction, the rotational force in the clockwise direction is also generated in the magnet 7 so as to make the center of the second outer magnetic pole 1b correspond to the center of the magnetized part of the magnet 7 (the center of the N pole). Accordingly, the magnet 7 starts rotating in the clockwise direction from the state of FIG. 5.

After the magnet 7 is rotated about 15° from the state of FIG. 5, the center of the second outer magnetic pole 1b corresponds to the center of the magnetized part of the magnet 7 (the center of the N pole). At this time, the center of the first outer magnetic pole 1a corresponds to a boundary of the magnetized part of the magnet 7 (the boundary between the S pole and the N pole), and, thus, the force for further rotating the magnet 7 in the clockwise direction is generated. Then, after the magnet 7 is further rotated about 15° from this state (rotated about 30° in the clockwise direction from the state of FIG. 5), the magnet 7 is stopped at this position as the rotational forces caused by the first and second coils 2 and 3 are well-balanced. This condition is illustrated in FIG. 6.

Second Embodiment

Figure 7:
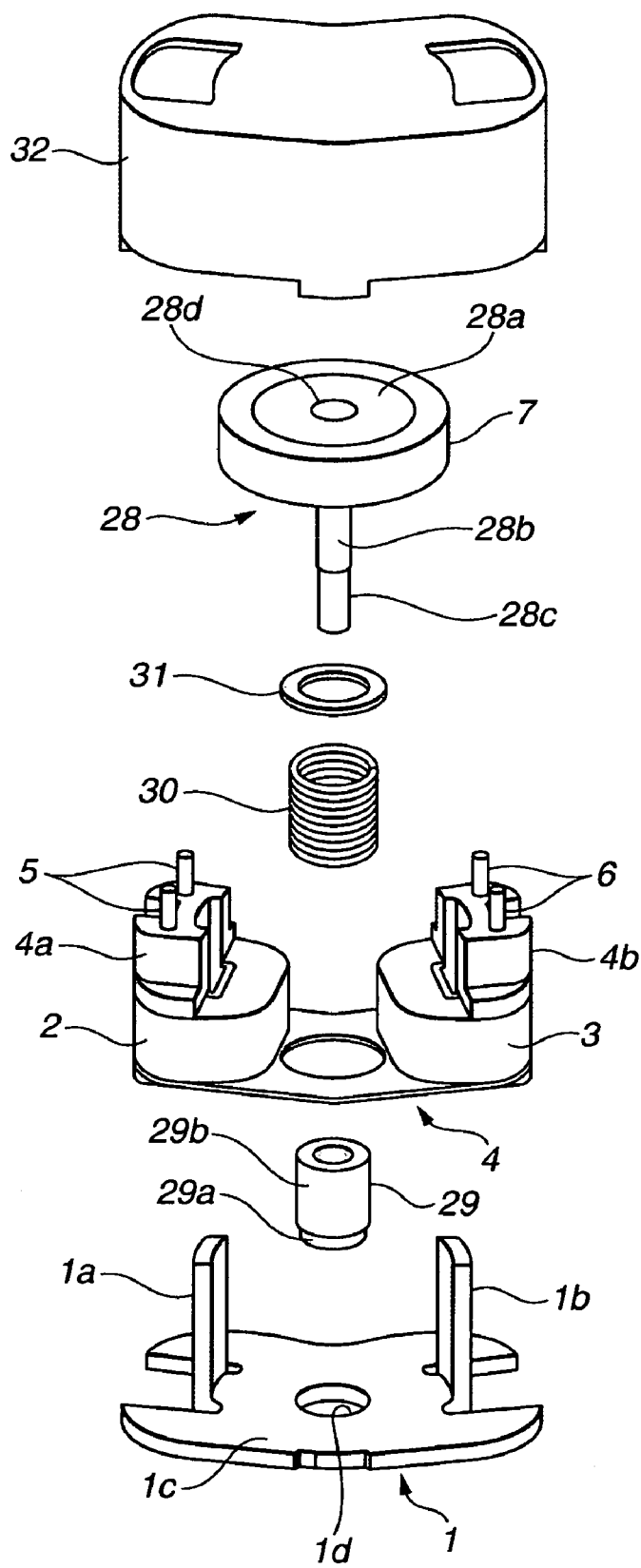
FIG. 7 is an exploded perspective view of a stepping motor according to a second embodiment of the present invention.
Figure 8:
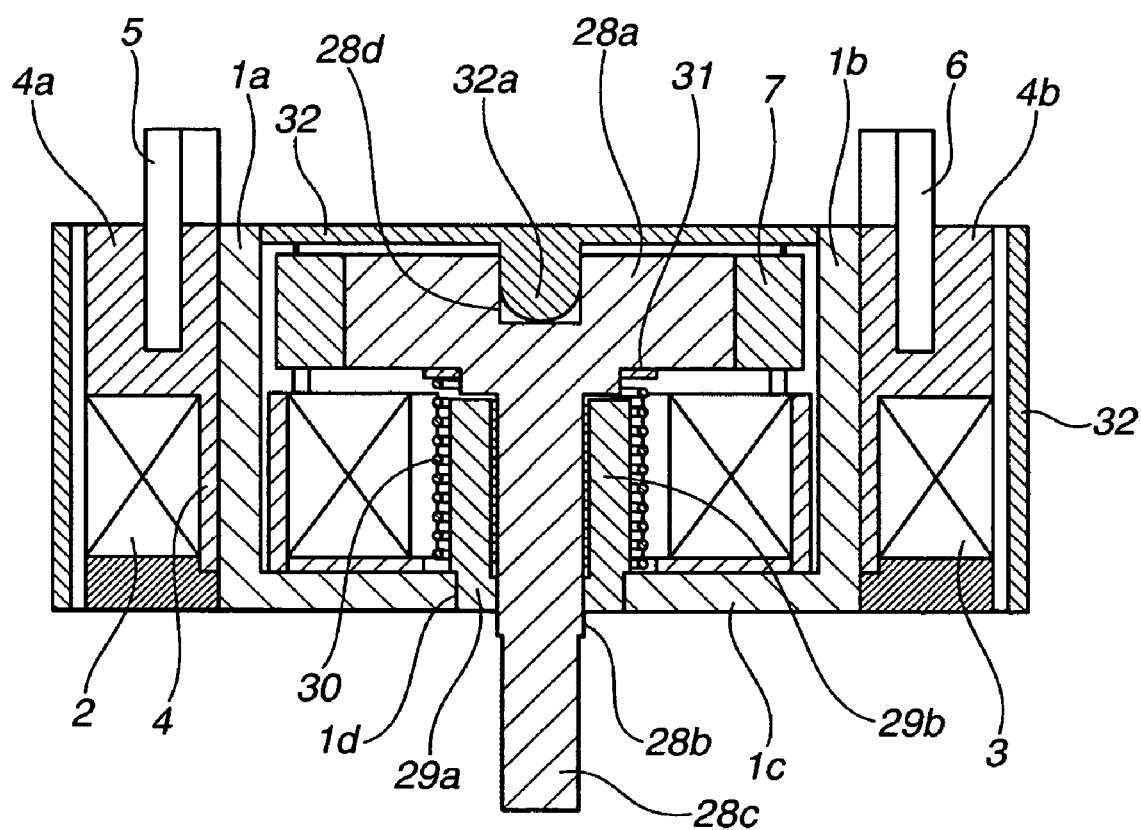
FIG. 8 is a longitudinal cross-sectional view of the stepping motor shown in FIG. 7.
Figure 9:
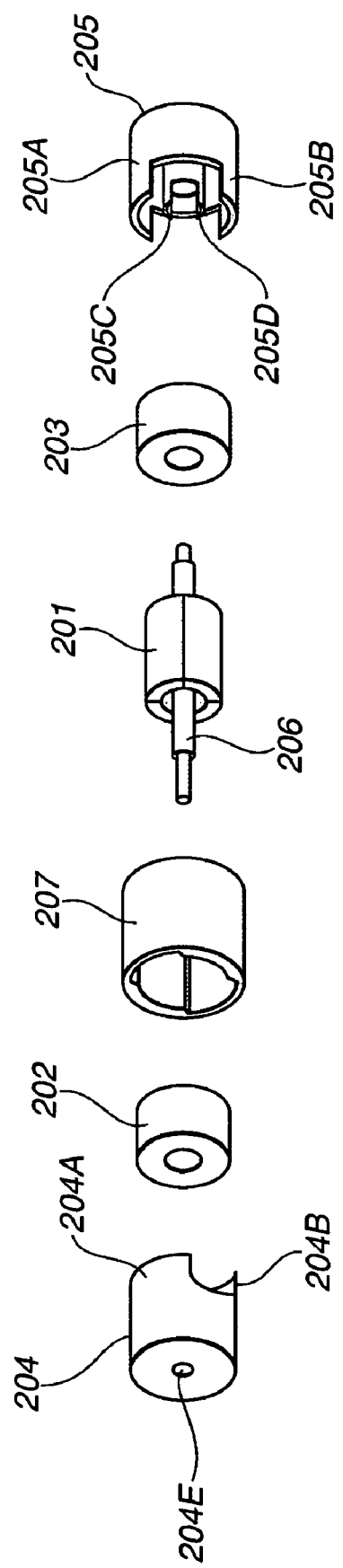
FIG. 9 is an exploded perspective view of a stepping motor of a first conventional example.
Figure 10:
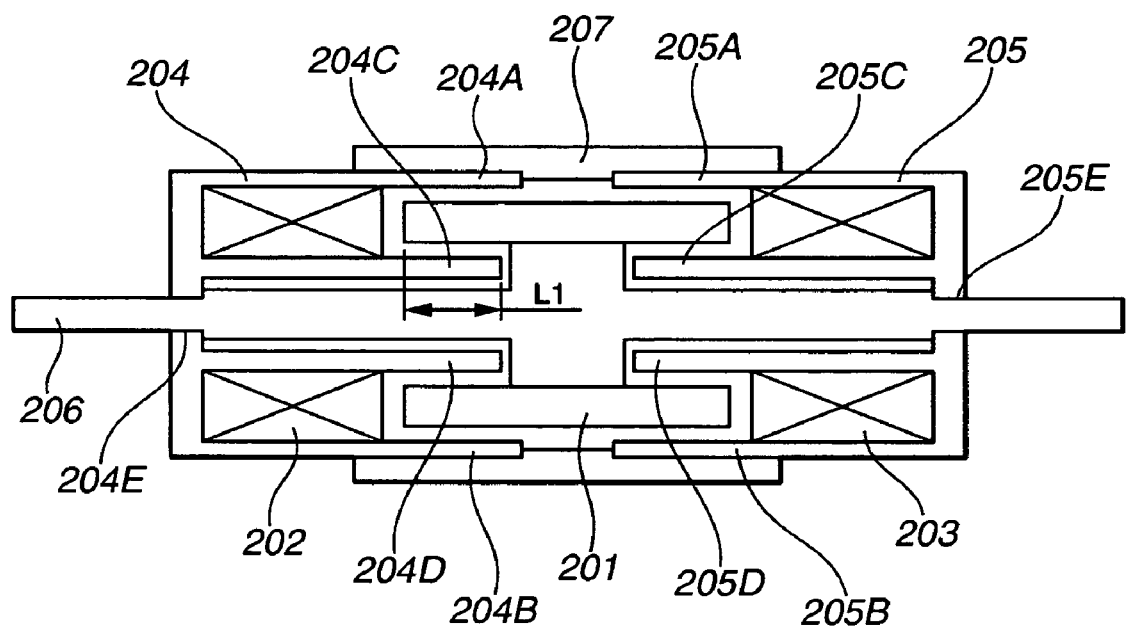
FIG. 10 is a longitudinal cross-sectional view of the stepping motor shown in FIG. 9.
Figure 11:
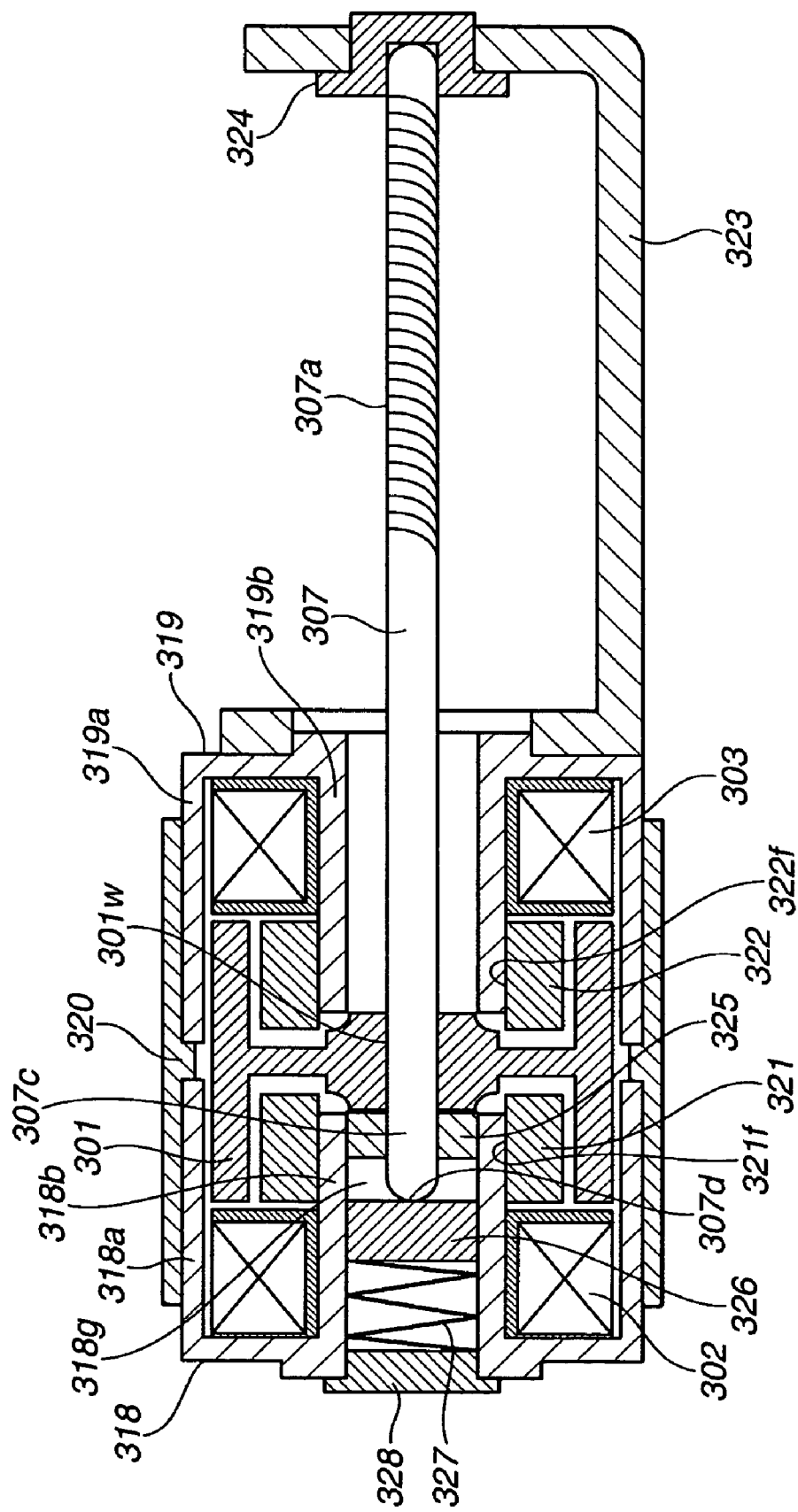
FIG. 11 is a longitudinal cross-sectional view of a stepping motor of a third conventional example.

FIG. 7 is an exploded perspective view of a stepping motor according to a second embodiment of the present invention. FIG. 8 is a longitudinal cross-sectional view of the stepping motor shown in FIG. 7.

In the second embodiment, the configuration of the stepping motor is basically similar to that of the above-described first embodiment, and the same or similar constituent elements as in the first embodiment are denoted by the same reference numerals as in the first embodiment, so that the duplicate description thereof is omitted. Thus, only the constituent elements different from those in the first embodiment are described below.

In FIGS. 7 and 8, the stepping motor according to the second embodiment includes a bearing part 29 made of a soft magnetic material, in addition to the stator 1, the bobbin body 4, the first coil 2, and the second coil 3. The bearing part 29 has a first column part 29a and a second column part 29b. The first column part 29a is disposed between the first coil 2 and the second coil 3, and is fitted into the hole 1d of the stator 1 to be fixed by pressing-in, caulking or laser welding. The first column part 29a rotatably supports a supporting shaft part 28b (to be described below). The second column part 29b has an inner diameter larger than the diameter of the supporting shaft part 28b, so that a slight space is provided between the inner circumferential surface of the second column part 29a and the outer circumferential surface of the supporting shaft part 28b. The stepping motor further includes a rotor part 28 made of a soft magnetic material and a cover 32 made of a nonmagnetic material. The rotor part 28 has the supporting shaft part 28b, an output shaft part 28c, a column part 28a, and a magnet 7. The supporting shaft part 28b is rotatably supported by the bearing part 29. The magnet 7 is fixed around the column part 28a by interference fit. The cover 32 is fixed to the stator 1 so as to house the bobbin body 4, the rotor part 28, and the stator 1, which are assembled together. The cover 32 includes a supporting shaft part 32a having a spherical surface-shaped top end at the rear surface of the center part thereof.

The rotor part 28 has a hole 28d, which receives the supporting shaft part 32a of the cover 32. Thus, the rotor part 28 is rotatably supported by the supporting shaft part 32a of the cover 32 at the hole 28d.

A compression coil spring 30 for urging the rotor part 28 in the axial direction of the motor (the upward direction in FIG. 8) is disposed between the column part 28a and the flat plate 1c of the stator 1 while housing the bearing part 29. A washer 31 made of Teflon (registered trademark) or the like is interposed between the column part 28a and the compression coil spring 30. As for the rotor part 28, the positioning in the axial direction of the motor is made by the bottom part of the hole 28d receiving the supporting shaft part 32a of the cover 32. That is, the rotor part 28, to which the magnet 7 is fixed, is urged in the axial direction of the motor (the upward direction in FIG. 8) by the compression coil spring 30, to thereby be biased in the axial direction of the motor. Thereby, the backlash in the axial direction of the motor of the rotor part 28 can be prevented.

Further, the rotor part 28, which is urged in the axial direction of the motor, is supported by the supporting shaft part 32a having a spherical surface-shaped top end at the rear surface of the cover 32. Accordingly, the rotor part 28 can be accurately supported by the cover 32. In addition, the slide friction can be decreased to facilitate the smooth rotation of the rotor part 28.

Further, the compression coil spring 30 is externally fitted to the bearing part 29, and is configured to urge the rotor part 28 through the washer 31. Therefore, the compression coil spring 30 is not rotated even when the rotor part 28 is rotated. Accordingly, the rotor part 28 can be stably biased, and abnormal noise can be prevented from occurring during the rotation of the rotor part 28.

A method for rotating and driving the stepping motor of the second embodiment is similar to that of the above first embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-266828 filed Sep. 14, 2004, which is hereby incorporated by reference herein in its entirety.

What is claimed is:

1. A stepping motor comprising:
   a stator including first and second outer magnetic poles extending in an axial direction of the stepping motor;

a rotor made of a soft magnetic material, the rotor being rotatably supported by the stator between the first and second outer magnetic poles;

a magnet fixed around the rotor;

a first coil and a second coil respectively wound around the first outer magnetic pole and the second outer magnetic pole and positioned between the magnet and the stator as viewed in the axial direction; and an urging unit configured to urge the rotor in the axial direction, wherein the rotor has a hole defined at a rotating center thereof, the urging unit being disposed in the hole.

2. The stepping motor according to claim 1, further comprising:

a cover made of a nonmagnetic material, the cover being fixed to the stator and being sized and shaped to house the first outer magnetic pole, the second outer magnetic pole, the first coil, and the second coil, the cover having a supporting shaft part rotatably fitted into the hole of the rotor.

3. The stepping motor according to claim 2, wherein the urging unit includes:

an urging member made of a nonmagnetic material having a spherical surface-shaped top end, the urging member being disposed in the hole of the rotor such that the top end contacts a bottom surface of the hole; and a compression coil spring disposed between the supporting shaft part and the urging member in the hole.

4. A stepping motor comprising:

a stator including first and second outer magnetic poles extending in an axial direction of the stepping motor;

a rotor made of a soft magnetic material, the rotor being rotatably supported by the stator between the first and second outer magnetic poles, the rotor having a hole defined at a rotating center thereof;

a magnet fixed around the rotor;

a first coil and a second coil respectively wound around the first outer magnetic pole and the second outer magnetic pole and positioned between the magnet and the stator as viewed in the axial direction; and an urging unit configured to urge the rotor in the axial direction; and a cover made of a nonmagnetic material, the cover being fixed to the stator and being sized and shaped to house the first outer magnetic pole, the second outer magnetic pole, the first coil, and the second coil, the cover having a supporting shaft part rotatably fitted into the hole of the rotor, wherein the supporting shaft part has a spherical surface-shaped top end, the top end being in contact with a bottom surface of the hole, and wherein the urging unit includes a compression coil spring disposed between the magnet and the stator and between the first coil and the second coil.

5. The stepping motor according to claim 4, further comprising a bearing part made of a soft magnetic material, wherein the rotor is supported by the stator though the bearing part, and the compression coil spring is disposed to house the bearing pad.

* * * * *